(12) United States Patent
Selimefendigil

(10) Patent No.: US 11,996,805 B1
(45) Date of Patent: May 28, 2024

(54) THERMOELECTRIC NANO JET COOLING SYSTEM

(71) Applicant: KING FAISAL UNIVERSITY, Al-Ahsa (SA)

(72) Inventor: Fatih Selimefendigil, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/545,543

(22) Filed: Dec. 19, 2023

(51) Int. Cl.
*F28F 7/00* (2006.01)
*H02S 40/42* (2014.01)

(52) U.S. Cl.
CPC .................................. *H02S 40/425* (2014.12)

(58) Field of Classification Search
CPC ..................................................... H02S 40/425
USPC ........................................................ 165/80.2
See application file for complete search history.

(56) References Cited

U.S. PATENT DOCUMENTS

2018/0269828 A1    9/2018  Beck et al.

FOREIGN PATENT DOCUMENTS

| CN | 106849866 A | * | 6/2017 |
| DE | 102010016163 A1 | * | 9/2011 |
| WO | WO2013119287 A1 | * | 8/2013 |

OTHER PUBLICATIONS

CN-106849866-A (tr).*

(Continued)

*Primary Examiner* — Davis D Hwu
(74) *Attorney, Agent, or Firm* — Nath, Goldberg & Meyer; Richard C. Litman

(57) ABSTRACT

A photovoltaic cooling system includes a cooling module having a local jet flow inlet located in an interior portion of the cooling module directing flow in a vertical direction. A crossflow inlet is located at an inlet edge of the cooling module directing flow across the cooling module. An outlet is located at an outlet edge of the cooling module. A thermoelectric generator is located on the cooling module, and a photovoltaic module is located on the thermoelectric generator.

13 Claims, 1 Drawing Sheet

(56) References Cited

OTHER PUBLICATIONS

Qianhao Ye, Yonghai Zhang, and Jinjia Wei, A comprehensive review of pulsating flow on heat transfer enhancement, https://doi.org/10.1016/j.applthermaleng.2021.117275.

Fatih Selimefendigil, and Hakan F. Öztop, Identification of pulsating flow effects with CNT nanoparticles on the performance enhancements of thermoelectric generator (TEG) module in renewable energy applications, https://doi.org/10.1016/j.renene.2020.07.071.

Fatih Selimefendigil, Hakan F. Oztop, Orcid and Ali J. Chamkha, Jet Impingement Heat Transfer of Confined Single and Double Jets with Non-Newtonian Power Law Nanofluid under the Inclined Magnetic Field Effects for a Partly Curved Heated Wall, https://doi.org/10.3390/su13095086.

V M Molochnikov, N I Mikheev, T A Vazeev and A A Paereliy, Pulsating flow past a tube bundle, DOI 10.1088/1742-6596/891/1/012049.

Mangesh Chaudhari; Bhalchandra Puranik; Amit Agrawal, Heat Transfer Analysis in a Rectangular Duct Without and With Cross-Flow and an Impinging Synthetic Jet, DOI: 10.1109/TCAPT.2010.2042716.

Ruixian Fang, Wei Jiang, and Jamil A. Khan, The effects of a cross-flow synthetic jet on single-phase microchannel heat transfer, DOI: 10.1615/JEnhHeatTransf.2012003386.

Yanyao Zhang, Ping Li, Yonghui Xie, Numerical investigation of heat transfer characteristics of impinging synthetic jets with different waveforms, https://doi.org/10.1016/j.applthermaleng.2021.117275.

\* cited by examiner

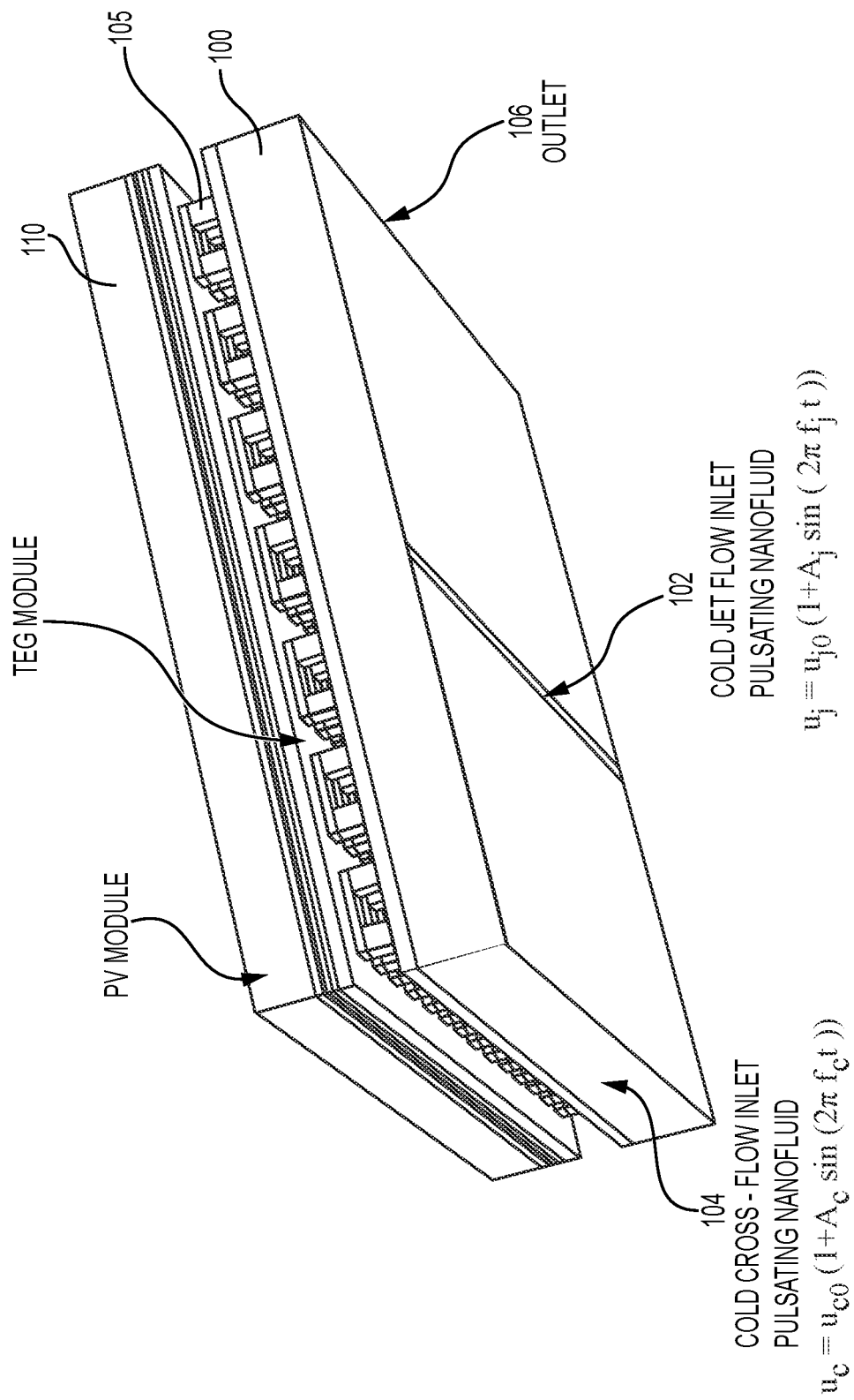

THERMOELECTRIC NANO JET COOLING SYSTEM

BACKGROUND

1. Field

The present disclosure relates to thermal management systems and more particularly cooling systems for photovoltaic solar cells.

2. Description of the Related Art

Thermal management and cooling of photovoltaic (PV) systems are important for improved performances and efficiencies. Solar irradiation that cannot be converted into electricity results in excessive temperatures of the PV-cell and performance degradation is observed.

SUMMARY

There is a need for effective cooling systems for performance enhancement in PV cells by reducing excessive temperatures.

A photovoltaic cooling system, in one embodiment, includes a cooling module having a local jet flow inlet located at an interior portion of the cooling module directing flow in a vertical direction. A crossflow inlet is located at an inlet edge of the cooling module directing flow across the cooling module. An outlet is located at an outlet edge of the cooling module. A thermoelectric generator is located on the cooling module, and a photovoltaic module is located on the thermoelectric generator.

The crossflow inlet receives a cold crossflow inlet pulsating nanofluid that satisfies the equation: $u_c=u_{co}(1+A_c \sin(2\pi t))$ wherein $u_{co}$ denotes the base cross-flow velocity and $A_c$, $f_c$ denote the pulsating cross-flow amplitude and frequency, respectively, while t denotes time.

The local jet flow inlet receives a cold jet flow inlet pulsating nanofluid that satisfies the equation: $u_j=u_{jo}(1+A_j \sin(2\pi f_j t))$ wherein $u_{jo}$ denotes the base jet-flow velocity, $A_j$ and $f_j$ denotes the pulsating jet-flow amplitude and frequency, and t denotes time.

A controller directs a cold crossflow inlet pulsating nanofluid to the crossflow inlet, and directs a cold jet flow inlet pulsating nanofluid to the local jet flow inlet.

The cold crossflow inlet pulsating nanofluid satisfies the equation: $u_c=u_{co}(1+A_c \sin(2\pi f_c t))$ wherein $u_{co}$ denotes the base cross-flow velocity and $A_c$, $f_c$ denote the pulsating cross-flow amplitude and frequency and the cold jet flow inlet pulsating nanofluid satisfies the equation: $u_j=u_{jo}(1+A_j \sin(2\pi f_j t))$.

The interior portion of the local jet flow inlet is a middle portion.

The outlet edge is located opposite the inlet edge.

A photovoltaic cooling system, in another embodiment, has a cooling module, a thermoelectric generator located on the cooling module, and photovoltaic system located on the thermoelectric generator. The system receives a cold crossflow inlet pulsating nanofluid in a crossflow inlet located at an inlet edge of the cooling module and directs the cold crossflow inlet pulsating nanofluid laterally across the cooling module. A cold jet flow inlet pulsating nanofluid is received in a local jet flow inlet located at an interior portion of the cooling module and directs the cold jet flow inlet pulsating nanofluid in a vertical direction.

The cold crossflow inlet pulsating nanofluid satisfies the equation: $u_c=u_{co}(1+A_c \sin(2\pi f_c t))$, wherein $u_{co}$ denotes the base cross-flow velocity and $A_c$ and $f_c$ denote the pulsating cross-flow amplitude and frequency, and the cold jet flow inlet pulsating nanofluid satisfies the equation: $u_j=u_{jo}(1+A_j \sin(2\pi f_j t))$ wherein $u_{jo}$ denotes the base jet-flow velocity, $A_j$ and $f_j$ denotes the pulsating jet-flow amplitude and frequency, and t denotes time.

The interior portion of the local jet flow inlet is a middle portion.

An outlet edge of the cooling module is located opposite the inlet edge.

A cooling module of photovoltaic cooling system includes: a local jet flow inlet located in an interior portion of the cooling module directing flow in a vertical direction; a crossflow inlet located at an inlet edge of the cooling module directing flow across the cooling module; and an outlet located at an outlet edge of the cooling module.

These and other features of the present subject matter will become readily apparent upon further review of the following specification.

BRIEF DESCRIPTION OF THE DRAWINGS

FIG. 1 is an illustration of a cooling module, a thermoelectric generator (TEG), and a photovoltaic module.

Similar reference characters denote corresponding features consistently throughout the attached drawings.

DETAILED DESCRIPTION OF THE PREFERRED EMBODIMENTS

Thermal management and cooling of photovoltaic (PV) systems are important for improved performances and efficiencies. Solar irradiation that cannot be converted into electricity results in excessive temperatures of the PV cell and performance degradation is observed. Therefore, effective cooling systems are needed for performance enhancement. A cooling system for thermal management of PV modules is needed.

The cooling system of the present disclosure includes a thermoelectric generator and jet impingement cooling with crossflow and jet flow. Both jet flow and crossflow are pulsating with different amplitudes and frequencies. Jet impingement is used for higher local cooling while cross flow is used for temperature uniformity of the PV module which is also an important factor in performance evaluation. Nanofluid is used in the jet and crossflow cooling systems while nanoparticle types in solid volume fractions in the base fluid can be varied. Flow pulsation parameters such as amplitude and frequency in jet and cross flow can be controlled to increase the generated power from the thermoelectric generator and reduce the temperature of the PV cell.

A cooling system, in one embodiment, includes a pulsating crossflow and pulsating nano-jet combined with a thermoelectric generator for thermal management of the photovoltaic module.

FIG. 1 is an illustration of a cooling module 100, a thermoelectric generator (TEG) 105 located on the cooling module 100 and a photovoltaic module 110 located on the TEG module 105.

The cooling module 100 has a local jet flow inlet 102 located at an interior portion of the cooling module 100 directing flow in a vertical direction. The interior portion of the local jet flow inlet can be a middle portion.

A crossflow inlet 104 is located at an inlet edge of the cooling module 100 directing flow across the cooling module 100. An outlet 106 is located at an outlet edge of the cooling module 100. The outlet edge can be located opposite the inlet edge.

The thermoelectric generator 105 is located on the cooling module 100, and a photovoltaic module 110 is located on the thermoelectric generator 105.

The crossflow inlet 104 receives a cold crossflow inlet pulsating nanofluid that satisfies the equation: $u_c=u_{co}(1+A_c \sin(2\pi f_c t))$ wherein $u_{co}$ denotes the base cross-flow velocity and $A_c$, $f_c$ denote the pulsating cross-flow amplitude and frequency, respectively, and t denotes time.

The local jet flow inlet 102 receives a cold jet flow inlet pulsating nanofluid that satisfies the equation: $u_j=u_{jo}(1+A_j \sin(2\pi f_j t))$ wherein $u_{jo}$ denotes the base jet-flow velocity, $A_j$ and $f_j$ denotes the pulsating jet-flow amplitude and frequency and t denotes time.

A controller directs a cold crossflow inlet pulsating nanofluid to the crossflow inlet 104, and directs a cold jet flow inlet pulsating nanofluid to the local jet flow inlet 102.

The cold crossflow inlet pulsating nanofluid satisfies the equation: $u_c=u_{co}(1+A_c \sin(2\pi f_c t))$ wherein $u_{co}$ denotes the base cross-flow velocity and $A_c$ and $f_c$ denote the pulsating cross-flow amplitude and frequency, and the cold jet flow inlet pulsating nanofluid satisfies the equation: $u_j=u_{jo}(1+A_j \sin(2 f_j t))$ wherein $u_{jo}$ denotes the base jet-flow velocity, $A_j$ and $f_j$ denotes the pulsating jet-flow amplitude and frequency, and t denotes time.

A hybrid nanofluid is used in base carrier fluid which includes at least two different nanoparticles. Hybrid nanofluids are used in energy systems and heat transfer applications for many reasons such as cost, stability and synergistic effects of individual nanoparticles.

A single pulsating jet and pulsating cross-flow can be used in cooling systems. Application of pulsating cross-flow in pulsating jet flow along with jet flow impingement cooling results in locally higher cooled regions while uniformity of the lower temperature is maintained over the entire surface since cross-flow effects are provided.

Cross-flow with impinging jet makes the cooling of temperature over the surface more uniform and cooling effects of the impinging cold nanofluid will be more effective for a large portion of the PV-surface.

The pulsating frequency/amplitude of cross-flow and pulsating frequency/amplitude of jet-flow can be controlled to obtain the highest power generation from TEG and lowest cell temperature of the PV module.

The utilization of hybrid nanoparticles in the base fluid makes the system more flexible in the selection of cooling liquid in terms of cost and stability of nanofluids.

It is to be understood that the present subject matter is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A photovoltaic cooling system, comprising:
a cooling module having a local jet flow inlet located at an interior portion of the cooling module directing flow in a vertical direction, a crossflow inlet located at an inlet edge of the cooling module directing flow across the cooling module, and an outlet located at an outlet edge of the cooling module;
a thermoelectric generator located on the cooling module; and
a photovoltaic module located on the thermoelectric generator.

2. The photovoltaic cooling system as recited in claim 1, wherein the crossflow inlet receives a cold crossflow inlet pulsating nanofluid.

3. The photovoltaic cooling system as recited in claim 2, wherein the cold crossflow inlet pulsating nanofluid satisfies the equation: $u_c=u_{co}(1+A_c \sin(\lambda \pi f_c t))$ wherein $u_{co}$ denotes the base cross-flow velocity and $A_c$, and $f_c$ denote the pulsating cross-flow amplitude and frequency, and t denotes time.

4. The photovoltaic cooling system as recited in claim 1, wherein the local jet flow inlet receives a cold jet flow inlet pulsating nanofluid.

5. The photovoltaic cooling system as recited in claim 1, wherein the cold jet flow inlet pulsating nanofluid satisfies the equation: $u_j=u_{jo}(1+A_j \sin(2\pi f_j t))$ wherein $u_{jo}$ denotes the base jet-flow velocity, $A_j$ and $f_j$ denotes the pulsating jet-flow amplitude and frequency and t denotes time.

6. The photovoltaic cooling system as recited in claim 1 further comprising a controller directing a cold crossflow inlet pulsating nanofluid to the crossflow inlet, and directing a cold jet flow inlet pulsating nano fluid to the local jet flow inlet.

7. The photovoltaic cooling system as recited in claim 6, wherein the cold crossflow inlet pulsating nanofluid satisfies the equation: $u_c=u_{co}(1+A_c \sin(2\pi f_c t))$ wherein $u_{co}$ denotes the base cross-flow velocity and $A_c$ and $f_c$ denote the pulsating cross-flow amplitude and frequency and the cold jet flow inlet pulsating nanofluid satisfies the equation: $u_j=u_{jo}(1+A_j \sin(2\pi f_j t))$ wherein $u_{jo}$ denotes the base jet-flow velocity, $A_j$ and $f_j$ denotes the pulsating jet-flow amplitude and frequency, and t denotes time.

8. The photovoltaic cooling system as recite in claim 1, wherein the interior portion of the local jet flow inlet is a middle portion.

9. A photovoltaic cooling system as recited in claim 1, wherein the outlet edge is located opposite the inlet edge.

10. A photovoltaic cooling system having a cooling module, a thermoelectric generator located on the cooling module, and photovoltaic module located on the thermoelectric generator, the system comprising:
receiving a cold crossflow inlet pulsating nanofluid in a crossflow inlet located at an inlet edge of the cooling module and directing the a cold crossflow inlet pulsating nanofluid laterally across the cooling module; and
receiving a cold jet flow inlet pulsating nanofluid in a local jet flow inlet located at an interior portion of the cooling module and directing the cold jet flow inlet pulsating nanofluid in a vertical direction.

11. The photovoltaic cooling system as recited in claim 10, wherein the cold crossflow inlet pulsating nanofluid satisfies the equation: $u_c=u_{co}(1+A_c \sin(2\pi f_c t))$ wherein $u_{co}$ denotes the base cross-flow velocity and $A_c$ and $f_c$ denote the pulsating cross-flow amplitude and frequency, and the cold jet flow inlet pulsating nanofluid satisfies the equation: $u_j=u_{jo}(1+A_j \sin(2\pi f_j t))$ wherein $u_{jo}$ denotes the base jet-flow velocity, $A_j$ and $f_j$ denotes the pulsating jet-flow amplitude and frequency, and t denotes time.

12. The photovoltaic cooling system as recited in claim 10, wherein the interior portion of the local jet flow inlet is a middle portion.

13. The photovoltaic cooling system as recited in claim 10, wherein an outlet edge of the cooling module is located opposite the inlet edge.

\* \* \* \* \*